J. P. SHEVLIN.
WATER MOTOR.
APPLICATION FILED OCT. 26, 1906.
898,516.
Patented Sept. 15, 1908.
2 SHEETS—SHEET 1.
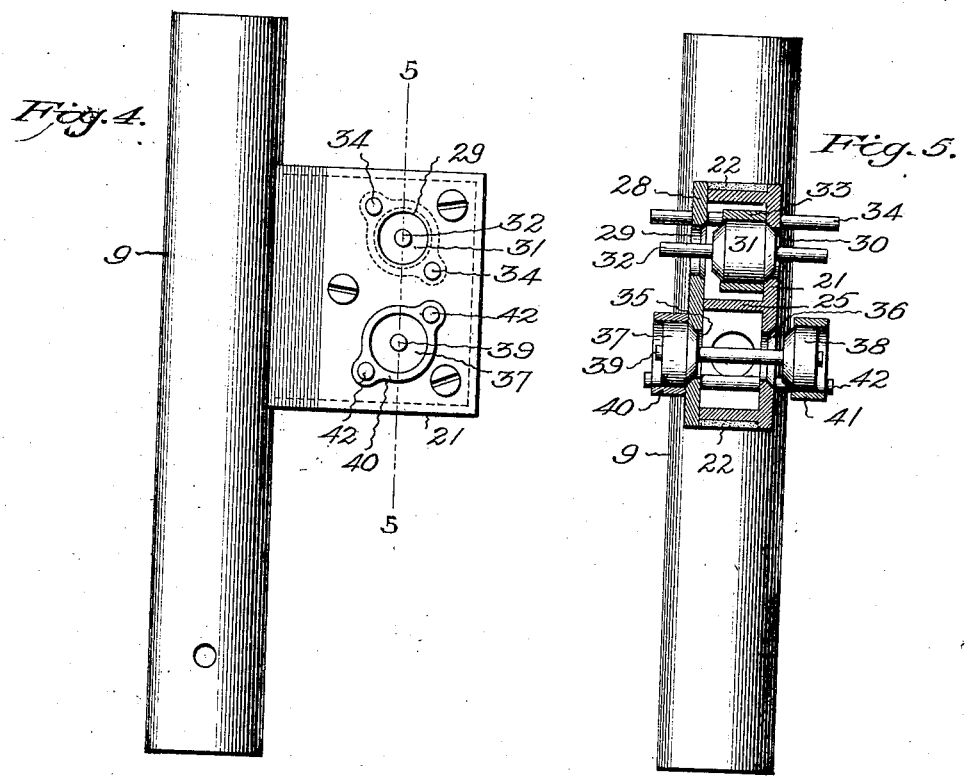
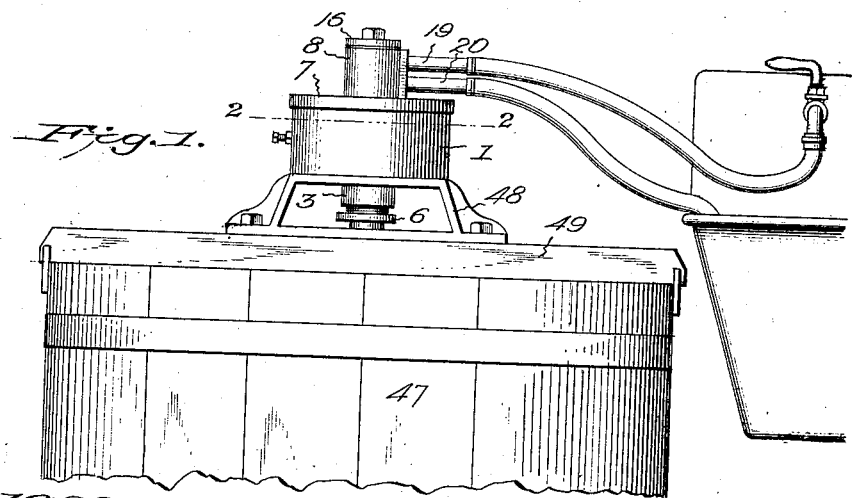
Witnesses
G. Sargent Elliott.
Adella M. Towle.
Inventor:
By Joseph P. Shevlin.
H. S. Bailey Attorney.

J. P. SHEVLIN.
WATER MOTOR.
APPLICATION FILED OCT. 26, 1906.
898,516.
Patented Sept. 15, 1908.
2 SHEETS—SHEET 2.
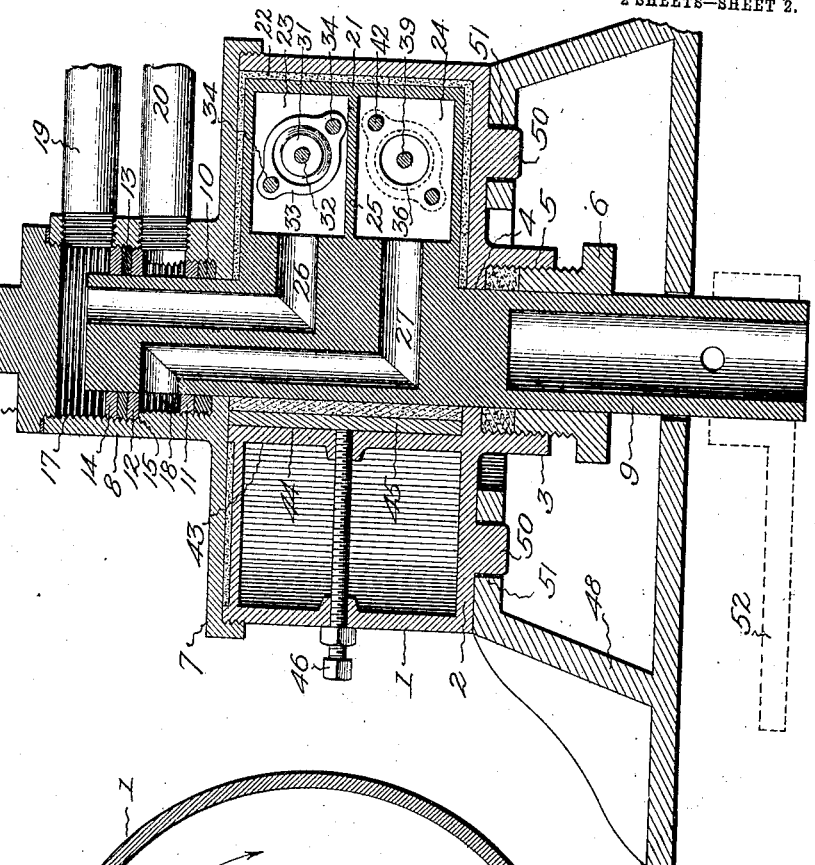
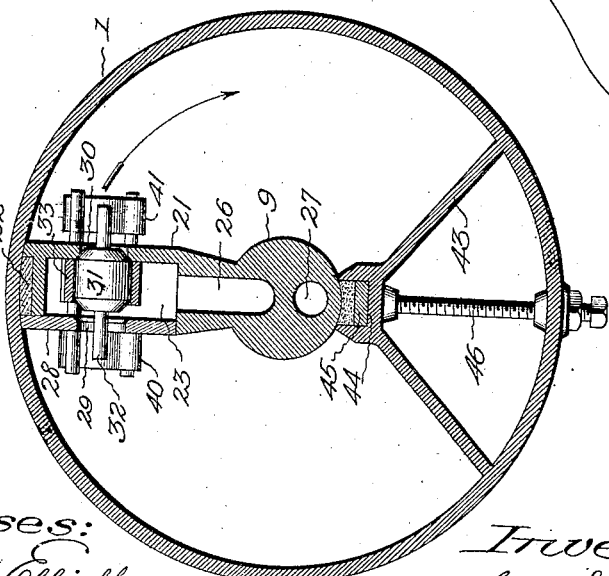
Witnesses:
G. Sargent Elliott.
Adella M. Towle.
Inventor:
By Joseph P. Shevlin
H. S. Bailey, Attorney

UNITED STATES PATENT OFFICE.

JOSEPH P. SHEVLIN, OF DENVER, COLORADO.

WATER-MOTOR.

No. 898,516.

Specification of Letters Patent.

Patented Sept. 15, 1908.

Application filed October 26, 1906. Serial No. 340,713.

*To all whom it may concern:*

Be it known that I, JOSEPH P. SHEVLIN, a citizen of the United States of America, residing at the city and county of Denver and State of Colorado, have invented a new and useful Water-Motor, of which the following is a specification.

My invention relates to improvements on water motors, and the object of my invention is to provide a simple, durable, positively acting, and automatically operating water motor, of the oscillating stroke type. I attain this object by the mechanism illustrated in the accompanying drawings, in which:

Figure 1, is a side elevation, illustrating the application of my improved motor to a washing machine. Fig. 2, is a horizontal sectional view thereof, on the line 2—2 of Fig. 1. Fig. 3, is a vertical sectional view of the same. Fig. 4, is a side elevation of the combined driving shaft and piston, showing the valves in said piston. And Fig. 5, is a vertical sectional view through the piston, on the line 5—5 of Fig. 4.

Similar letters of reference refer to similar parts throughout the several views.

Referring to the drawings, the numeral 1, designates a cylindrical casing, which forms the cylinder of my motor. This cylinder is provided with one integral head 2, which is provided with a stuffing box hub 3, which projects from it, and an axial aperture 4 is formed through this head and through the packing hub 3. A packing chamber 5, is formed in the hub, and a gland 6, is threaded or otherwise secured to the hub. To the opposite end of the cylinder I secure a cylinder head 7, by any suitable means, preferably by threading it to the exterior surface of the end of the cylinder. This removable cylinder head is also provided with a projecting hub portion 8, which is provided with an axial bore of two diameters, the larger of which is at the entrance to the hub. At the bottom of the smaller bore a still smaller bore is formed through the cylinder head, in which is revolubly fitted one end of the driving shaft 9. Both of the axial bores of the hub are threaded throughout their length and in the lower part of the smaller bore a packing ring 10, of leather or rubber or other suitable material, is placed, and a ring 11 is threaded to the threads of the smaller bore, and is adapted to screw up against the packing ring tight enough to force it around the combined valve stem and driving shaft. Within the larger bore is placed around the end of the shaft 9, a partition, comprising metal rings 12 and 14, and a packing ring 13. The ring 12 is threaded to screw into the larger bore of the hub against the shoulder 15, formed at the junction of the two bores in the hub, and the packing ring 13 rests on the ring 12, and the ring 14, is also threaded to screw into the hub against the packing ring tight enough to force the packing ring against the combined valve stem and driving shaft. The top surfaces of the rings 14 and 12 are provided with apertures that are adapted to receive the ends of a suitable wrench, by which they may be screwed tight against the packing ring. The upper end of the hub 8, is closed by a cap 16, and the partition divides the hub into two chambers 17 and 18. The upper chamber is tapped to receive a water supply pipe 19, and the lower chamber connects with an exhaust water pipe 20. The upper end of the shaft 9, extends into the chamber 17, and the lower end of the shaft extends down below the gland far enough to be secured upon the operating shaft of a washing machine, or any other machine to be operated.

The shaft 9, is provided with a lateral wing 21, which fits closely between the heads and against the periphery of the cylinder, a suitable packing 22, being placed around the edges of the wing, which contact with the cylinder. This wing forms a piston, and it is in the form of a hollow casing which is divided centrally into two chambers 23 and 24, by a horizontal partition 25; the upper chamber is connected with the upper chamber 17 of the hub 8, by a port 26, which extends through the shaft from the chamber 23 to the chamber 17; and the chamber 24 is connected by a port 27, with the hub chamber 18, the port 27 running through the shaft 9, parallel with the port 26 to a point on a plane with the chamber 18, where it opens out laterally into that chamber. Thus the inlet and outlet chambers in the piston and in the hub 8, are separated from and independent of each other.

A removable plate or cover 28, is suitably secured upon one side of the piston, so that access may be had to the chambers 23 and 24. The sides of the inlet chamber 23, are formed with ports 29 and 30, which are controlled by a double ended plug valve 31, having a stem 32, which extends from each end of the valve, through the ports 29 and 30 a suitable distance beyond the sides of the piston. This valve is supported within the chamber in a sleeve 33, of less length than the width of the chamber, and this sleeve is in turn supported upon two diametrically opposite stems 34, each of which projects laterally from each end of the sleeve, through and beyond the sides of the piston, to points slightly beyond the ends of the stem 32, of the plug valve. The outlet or exhaust chamber 24, is formed with exhaust ports 35 and 36, which are controlled by valves 37 and 38, which are secured upon the end of a stem 39, which passes through the ports. These valves are on the outside of the chamber and are supported in sleeves 40 and 41, which are secured adjacent to the ends of a pair of stems 42, which extend through the sides of the chamber. The ends of the stems 42, extend slightly beyond the ends of the stem 39, and the sleeves 33, 40, and 41 besides supporting, respectively, the valves 31, 37 and 38, act to cut off the live and exhaust water instantly before the valves are thrown, as will presently be more fully explained.

The piston 21, is adapted to oscillate within the cylinder, by reversing the valves to admit water under pressure, alternately on opposite sides of the piston, and this operation is accomplished in the following manner: A V-shaped partition or abutment 43, is formed in the cylinder, with its apex against the shaft 9. This apex is formed with a packing groove 44, in which a suitable packing is placed, and this packing is held against the shaft by a metal strip 45, which lies in the bottom of the groove, and which is pressed against the packing by a set screw 46, which extends out through the casing, and which is held at any adjustment by a check nut. The two sides of this abutment receive the impact of the sleeve and valve stems, which are thereby shifted reversing the positions of the valves and sleeves, and also the direction of the water. The valves 31, 37, and 38, have a sliding movement within their respective sleeves, and the sleeves have a corresponding movement on their stems, which movement is only sufficient to uncover one set of ports far enough to permit a free passage of water through them, while the other set of ports are closed. The sleeves and valves move in the same direction at the same time, but the sleeves move slightly in advance of the valves, as their stems, which extend slightly beyond the stems of the valves, are the first to contact with the abutment. Now, assuming that the valves are in the position shown in Fig. 5, and that the piston is moving in the direction indicated by the arrow in Fig. 2, the sleeve pins 34 and 42, will simultaneously contact with the abutment shifting the sleeves and thereby cutting off the water under pressure from the port 29, and closing the exhaust port 36. Immediately after the sleeve pins contact with the abutment, the valve pins will also contact with it, and this will result in simply unseating the valves, which will instantly be thrown to the opposite ports, by the pressure of the water. Thus, the sleeve acts to cut off the water from the open ports, thus relieving the pressure on the valves, then the valves are unseated by the contact of their stems with the abutment and are immediately thrown to opposite positions, the inlet valve by the water under pressure, and the exhaust valve also by the inflowing of the water under pressure.

The operation of the improved water motor is as follows: Water under pressure is admitted to the hub chamber 17 through the pipe 19, and passes down through the port 26 to the upper piston chamber 23, and out through either the port 29 or 30, into the cylinder, between the piston and abutment, causing the piston to move away from the abutment, while the exhaust water on the opposite side of the piston is forced into the lower or exhaust chamber 24, of the piston, through either the port 35 or 36, whence it passes through port 27 to the lower hub chamber 18, and thence through pipe 20, to waste, the valves being alternately shifted to change the direction of the water, in the manner previously indicated.

In Fig. 1, I have shown the motor attached to a washing machine 47, and when thus employed it will be supported upon a bracket 48, which is secured to a bar 49, which rests upon the top of the machine. The bottom of the cylinder is formed with depending lugs 50, which lie in holes 51 in the bracket, and thus prevent the motor from turning. When used to produce a direct oscillating movement as in Fig. 1, the lower end of the shaft 9, is formed hollow, so as to be slipped upon the shaft of the machine, to which it may be secured in any suitable manner, as by a pin which passes through the end of the motor shaft, and that of the machine operated. When however, it is desired to produce a reciprocating or a circular motion, a crank arm 52, may be secured to the lower end of the shaft 9, as shown in dotted lines, Fig. 3, to which one end of a connecting rod or pitman may be pivotally attached, and the oscillating movement of the shaft 9, will thus be converted into either a reciprocating or a circular motion through the medium of the crank and pitman.

I do not herein claim broadly the combination in a water motor of a headed cylinder, a piston within said cylinder, provided with two interior compartments separated by a partition, having ports which communicate with the cylinder, double-acting valves for controlling the ports in the compartment, an inlet communicating with one compartment, an outlet communicating with the other compartment, and longitudinally movable sleeves for supporting said valves, the same being the subject-matter, in part, of U. S. Letters Patent 858,226, granted June 25, 1907, to J. P. and H. P. Shevlin.

Having described my invention, what I claim as new and desire to secure by Letters Patent, is:

1. In a water motor of the oscillating type, a cylinder, a hub projecting axially from said cylinder, having two chambers, a shaft extending through said cylinder having ports which communicate with the chambers, a lateral piston on the shaft having chambers which communicate with the shaft ports, and ports communicating with the cylinder, an abutment partition in said cylinder, and slide valves for controlling the piston ports, which contact with said abutment.

2. In a water motor of the oscillating type, a cylinder, a hub projecting axially from said cylinder having two independent chambers and pipes leading from said chambers, a shaft extending through the cylinder, its upper end extending into the upper chamber of the hub, and having two ports, one of which communicates with said upper hub chamber while the other communicates with the lower chamber, a lateral piston on the shaft having two independent interior chambers, which communicate respectively with the two shaft ports, and ports which communicate with the cylinder, an abutment partition in said cylinder, and slide valves for controlling said piston ports, which contact with the abutment at each stroke of the piston.

3. In a water motor of the kind specified, the combination with a cylinder, a shaft in the cylinder having inlet and exhaust ports, a lateral piston on the shaft, having inclosed chambers communicating with the shaft ports, and lateral ports in said chambers communicating with the cylinder, of means for controlling said chamber ports, comprising a double-headed plug valve in one of said chambers, having a stem projecting from each end thereof through and beyond the ports of said chamber, a sleeve inclosing said plug valve of less length than the width of the chamber, having laterally projecting stems which extend through the sides of the chamber slightly beyond the end of the valve stem, a stem extending through the ports of the other chamber, having a valve adjacent to each end, but on the outside of the chamber, a supporting sleeve for each valve connected by stems which pass through the chamber and extend slightly beyond the ends of the valve stem, and an abutment partition in the cylinder, with which the sleeve and valve stems contact at each stroke of the piston.

4. The combination with a cylinder, a ported piston shaft in said cylinder, a lateral piston on said shaft having independent inclosed chambers communicating with the shaft ports, and which have lateral ports communicating with the cylinder, of means for controlling said lateral ports comprising double acting slide valves having laterally projecting stems, sleeves supporting said valves, adapted to slide independently of the valves and having stems which extend slightly beyond the ends of the valve stems, and an abutment partition in said cylinder, with which the valve and sleeve stems contact at each stroke of the piston.

5. In a water motor as specified, the combination with a cylinder, a ported piston shaft, a lateral piston on said shaft having chambers communicating with the shaft ports, and with the cylinder by lateral ports, and slide valves, with laterally projecting stems, for controlling said lateral ports, of means for cutting off the pressure from said valves before they are unseated, and for permitting the valves to be reversed by water pressure, consisting of sleeves which inclose said valves, which slide independently of the valves and which are supported upon stems of slightly greater length than the valve stems, and an abutment partition in said cylinder with which the sleeve and valve stems contact at each stroke of the piston.

6. In a water motor as specified, a cylinder, a ported piston shaft, a chambered piston on said shaft communicating with said shaft ports, and having ports in said chambers which communicate with the cylinder, slide valves for reversing the direction of water through said ports, having laterally projecting stems, sleeves inclosing said valves, having an independent sliding movement, and provided with projecting stems of greater length than the valve stems, and a V-shaped abutment partition in said cylinder, with which the stems contact, having a packing groove adjoining the piston shaft, a packing in said groove, a metal strip beneath said packing, and a set screw extending through said cylinder and engaging said strip.

In testimony whereof I affix my signature in presence of two witnesses.

JOSEPH P. SHEVLIN.

Witnesses:
G. SARGENT ELLIOTT,
ADELLA M. FOWLE.